US011113332B2

(12) United States Patent
Avnor et al.

(10) Patent No.: US 11,113,332 B2
(45) Date of Patent: Sep. 7, 2021

(54) SYSTEMS METHODS AND COMPUTER STORAGE MEDIA FOR COLLECTING AND PROCESSING PROGRESSIVISTIC METADATA IN SPORTS

(71) Applicant: PEAK PERFORMANCE RESULTS LTD, Hod Hasharon (IL)

(72) Inventors: Efrat Avnor, Hod Hasharon (IL); Sami Sabri, Hod Hasharon (IL)

(*) Notice: Subject to any disclaimer, the term of this patent is extended or adjusted under 35 U.S.C. 154(b) by 48 days.

(21) Appl. No.: 16/726,876

(22) Filed: Dec. 25, 2019

(65) Prior Publication Data

US 2020/0133976 A1 Apr. 30, 2020

(30) Foreign Application Priority Data

Mar. 31, 2019 (GB) ..................... 1904514

(51) Int. Cl.
*G06F 16/78* (2019.01)
*G11B 27/28* (2006.01)
*H04N 21/84* (2011.01)
*G11B 27/031* (2006.01)

(52) U.S. Cl.
CPC ............ *G06F 16/78* (2019.01); *G11B 27/031* (2013.01); *G11B 27/28* (2013.01); *H04N 21/84* (2013.01)

(58) Field of Classification Search
CPC ....... G06F 16/78; G11B 27/031; G11B 27/28; H04N 21/84
See application file for complete search history.

(56) References Cited

U.S. PATENT DOCUMENTS 9,602,858 B1* 3/2017 Kaiser .................. H04N 21/233
2020/0204834 A1* 6/2020 Loheide ............. H04N 21/8549

OTHER PUBLICATIONS

Christian Frodl Commercialization of Sports Data: Rights of Event Owners Over Information and Statistics Generated About Their Sports Events Marquette Sports Law Review, vol. 26, Issue 1, Fall 2015.

* cited by examiner

*Primary Examiner* — Mishawn N. Hunter
(74) *Attorney, Agent, or Firm* — Mark David Torche; Patwrite Law (57) ABSTRACT

Systems, methods and computer readable storage media for collecting and processing progressivistic metadata are described; a structure of composite files comprising a progressivistic metadata layer and implementational aspects of various uses thereof are further described.

19 Claims, 4 Drawing Sheets

SYSTEMS METHODS AND COMPUTER STORAGE MEDIA FOR COLLECTING AND PROCESSING PROGRESSIVISTIC METADATA IN SPORTS

CROSS-REFERENCE TO RELATED APPLICATIONS

The present application claims the benefit of Paris convention priority to and from GB patent application Ser. No. 1904514.5 filed on 31 Mar. 2019, the content of which is hereby incorporated herein in its entirety by this reference.

TECHNICAL FIELD

In general, the present invention pertains to the art of computer science. In particular, the invention relates to systems, methods and computer readable storage media for collecting and processing progressivistic metadata in sports.

BACKGROUND ART

State of the art sports analytics refers to collection of relevant, historical, statistics that when properly applied can provide a competitive advantage to a team or individual. Through the collection and analyzation of data, sports analytics provides information to players, coaches and other staff in order to facilitate decision making both during and prior to sporting events. The term "sports analytics" was popularized in mainstream culture following the release of the Moneyball 2011 film, depicting the use of sports analytics to build a competitive team on a minimal budget.

Two key aspects of sports analytics are on-field and off-field analytics. On-field analytics deals with improving the on-field performance of teams and players and is concerned with such aspects as game tactics and player fitness, whereas off-field analytics typically deals with business-related aspects of sports, such increasing ticket and merchandise sales, improving fan engagement, etc.

As technology has advanced over the last years, data collection has become more in-depth and can be conducted with relative ease by automated means, inter alia by employing automated artificial intelligence systems. Eigil Hakedal Skjæveland Master's Thesis on Identifying Higher-Level Semantics in Football Event Data, from the Department of Informatics at the University of Oslo, dated 31 Jul. 2017, explores the extracting of higher-level events from the event data commercially available software Opta™ and characteristics of mapping the XML data to databases and querying it. The content of the Eigil Hakedal Skjæveland Master's Thesis on Identifying Higher-Level Semantics in Football Event Data is hereby incorporated herein in its entirety by this reference.

Definitions

A timecode is a sequence of numeric codes generated at regular intervals by a timing synchronization system. Timecode is used in video production, show control and other application which require temporal coordination or logging of recording or actions. SMPTE timecode is used extensively for synchronization and for logging and identifying material in recorded media. This shot-logging process was traditionally done by hand using pen and paper but is now typically done using shot-logging software running on a laptop computer that is connected to the time code generator or the camera itself. The SMPTE family of timecodes are almost universally used in film, video and audio production, and can be encoded in many different formats, including: Linear timecode (LTC) in a separate audio track, Vertical interval timecode (VITC) in the vertical blanking interval of a video track, AES-EBU embedded timecode used with digital audio, burnt-in timecode in human-readable form in the video itself and CTL timecode.

A Keykode (written as KeyKode or KeyCode) is an Eastman Kodak Company advancement on edge numbers, which are letters, numbers and symbols placed at regular intervals along the edge of 35 mm and 16 mm film to allow for frame-by-frame specific identification. Keykode is a variation of timecode used in the post-production process which is designed to uniquely identify film frames in a film stock.

The terms event data, performance data or alike, as referred to herein, is to be construed as a data layer synchronized with a timecode or keykode of a video file, including information of logged events that actually occurred during a sport game. Examples of event data include the data collected and processed by the commercially available software Opta™.

The term progressivistic metadata, is to be construed as a metadata layer synchronized with a timecode or keykode of a video file, including logged information of events that has not occurred during a sport game. For the sake of clarity, it is further specified that progressivistic metadata is defined as logged information of events that has not occurred during a sport game, regardless of whether the progressivistic metadata layer was encoded during the game, e.g. in a real-time regime or after a predefined delay (i.e. postponed mode), or at any time after the sport game. For the sake of clarity, it is yet further specified that progressivistic metadata is defined as logged information of events that has not occurred during a sport game, regardless the identity of the person actually logging the information of events that has not occurred during a sport game, whether player, trainer, scouter, etc.

The term field goal, as referred to herein, is to be construed as a basket scored on any shot or tap other than a free throw, worth two or three points depending on the distance of the attempt from the basket. The term field goal may include field-goals made (FGM), field-goals attempted (FGA) and field goal percentage (FG %). Uncommonly, a field goal can be worth other values such as one point in FIBA 3×3 basketball competitions or four points in the BIG3 basketball league. "Field goal" is the official terminology used by the National Basketball Association (NBA) in their rule book, in their box scores and statistics, and in referees' rulings. The same term is also the official wording used by the National Collegiate Athletic Association (NCAA) and high school basketball.

The term turnover, frequently presented by the acronym TO, as referred to herein, is to be construed as a situation in basketball where a team loses possession of the ball to the opposing team before a player takes a shot at their team's basket. This can result from the ball being stolen, the player making mistakes such as stepping out of bounds, illegal screen, a double dribble, having a pass intercepted, throwing the ball out of bounds, three-second violation, five-second violation, or committing an error such as traveling, a shot clock violation, palming, a backcourt violation, or committing an offensive foul.

The term steal, frequently presented by the acronym STL, as referred to herein, is to be construed as a situation in basketball where a defensive player legally causes a turnover by his positive, aggressive action. A steal can be done by deflecting and controlling, or by catching the opponent's pass or dribble of an offensive player. The defender must not touch the offensive player's hands or otherwise a foul is called. Steals are credited to the defensive player who first causes the turnover, even if he does not end up with possession of the live ball. To earn a steal, the defensive player must be the initiator of the action causing the turnover, not just the benefactor. Whenever a steal is recorded by a defensive player, an offensive player must be credited as committing a turnover.

Whenever the terms "server", "agent", "system" or "module" is used herein, it should be construed as a computer program, including any portion or alternative thereof, e.g. script, command, application programming interface (API), graphical user interface (GUI), etc., and/or computational hardware components, such as logic devices and application integrated circuits, computer storage media, computer micro-processors and random access memory (RAM), a display, input devices and networking terminals, including configurations, assemblies or sub-assemblies thereof, as well as any combination of the former with the latter.

The term storage as referred to herein is to be construed as including one or more of volatile or non-volatile memory, hard drives, flash storage devices and/or optical storage devices, e.g. CDs, DVDs, etc. The term "computer-readable media" as referred to herein can include transitory and non-transitory computer-readable instructions, whereas the term "computer-readable storage media" includes only non-transitory readable storage media and excludes any transitory instructions or signals. The terms "computer-readable media" and "computer-readable storage media" encompass only a computer-readable media that can be considered a manufacture (i.e., article of manufacture) or a machine. Computer-readable storage media includes "computer-readable storage devices". Examples of computer-readable storage devices include volatile storage media, such as RAM, and non-volatile storage media, such as hard drives, optical discs, and flash memory, among others.

The term integrated shall be construed inter alia as operable on the same machine and/or executed by the same computer program. Depending on the actual deployment of the method, its implementation and topology, integration of agents and/or integration into modules as well as the terms "transfer", "relaying", "transmitting", "forwarding", "retrieving", "accessing", "pushed" or similar refer to any interaction between agents via methods inter alia including: function calling, Application Programming Interface (API), Inter-Process Communication (IPC), Remote Procedure Call (RPC) and/or communicating using of any standard or proprietary protocol, such as SMTP, IMAP, MAPI, OMA-IMPS, OMA-PAG, OMA-MWG, SIP/SIMPLE, XMPP, SMPP.

The term network, as referred to herein, should be understood as encompassing any type of computer and/or data network, in a non-limiting manner including one or more intranets, extranets, local area networks (LAN), wide area networks (WAN), wireless networks (WIFI), the Internet, including the world wide web, and/or other arrangements for enabling communication between the computing devices, whether in real time or otherwise, e.g., via time shifting, cashing, batch processing, etc.

The relational database term network, as referred to herein, should be construed as any digital database based on the relational model of data, as proposed by E. F. Codd in 1970. A software system used to maintain relational databases is a Relational Database Management System (RDBMS). Typically, relational database systems use Structured Query Language (SQL) for querying and maintaining the database.

Whenever in the specification hereunder and particularly in the claims appended hereto a verb, whether in base form or any tense, a gerund or present participle or a past participle are used, such terms as well as preferably other terms are to be construed as actual or constructive, meaning inter alia as being merely optionally or potentially performed and/or being only performed anytime in future. The terms essentially and substantially, or similar relative terms, are to be construed in accordance with their ordinary dictionary meaning, namely mostly but not completely.

As used herein, the term "or" is an inclusive "or" operator, equivalent to the term "and/or," unless the context clearly dictates otherwise; whereas the term "and" as used herein is also the alternative operator equivalent to the term "and/or," unless the context clearly dictates otherwise.

It should be understood, however, that neither the briefly synopsized summary nor particular definitions hereinabove are not to limit interpretation of the invention to the specific forms and examples but rather on the contrary are to cover all modifications, equivalents and alternatives falling within the scope of the invention.

DESCRIPTION OF THE DRAWINGS

The present invention will be understood and appreciated more comprehensively from the following detailed description taken in conjunction with the appended drawings in which.

While the invention is susceptible to various modifications and alternative forms, specific embodiments thereof have been shown merely by way of example in the drawings. The drawings are not necessarily complete and not all components are definitely shown; emphasis instead being placed upon clearly illustrating the principles underlying the present invention.

DETAILED DISCLOSURE OF EMBODIMENTS

Illustrative embodiments of the invention are described below. In the interest of clarity, not all features of actual implementation are described in this specification. It will of course be appreciated that in the development of any such actual embodiment, numerous implementation-specific decisions must be made to achieve the developers' specific goals, such as compliance with technology- or business-related constraints, which may vary from one implementation to another. Moreover, it will be appreciated that the effort of such a development might be complex and timeconsuming, but would nevertheless be a routine undertaking for those of ordinary skill in the art having the benefit of this disclosure.

Figure 1:
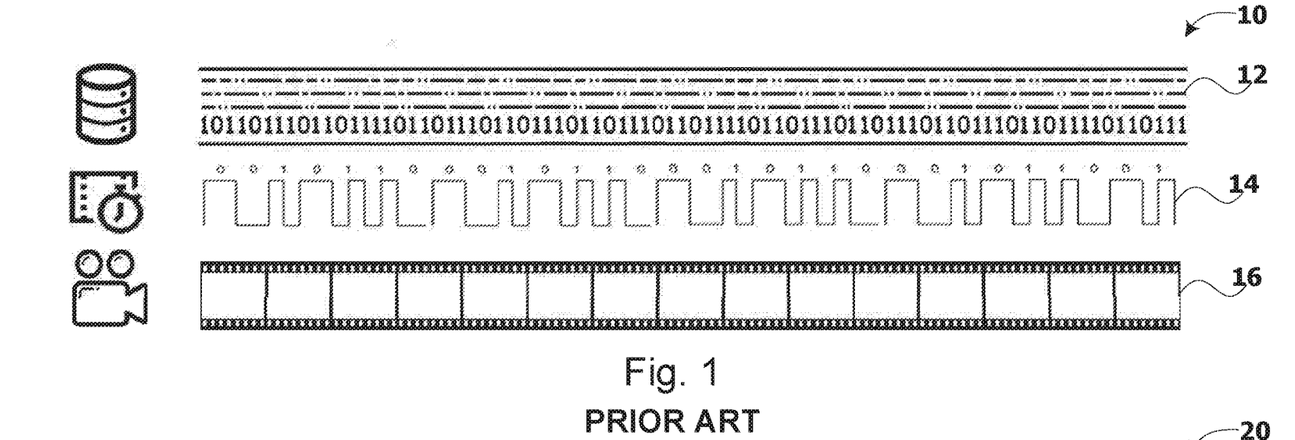
FIG. 1 is schematic representation of the structure of a file including an even data layer synchronized with a timecode or keykode of a video file, according to prior art.

Prior to elaborating any embodiment of the present invention, in order to present the background for the inventive concept more clearly, reference is firstly made to FIG. 1 showing schematic representation of the structure of a composite file 10, known in the art. Composite prior art file 10 includes video file layer 16, which is optionally a recording of a sport event. Video file layer 16 is optionally a recording of a broadcast or podcast stream of a sport event and may include an edited video stream, selectively compiled from a plurality of video streams recorded by different video cameras.

Composite file 10 further includes a timecode or keykode layer 14, as defined hereinabove. In some examples, timecode layer 14 is encoded directly into and/or forming a part of and/or otherwise combined with video file layer 16. Timecode layer 14 is configured to uniquely identify particular frames or at least distinct segments in video file layer 16.

Composite file 10 further includes an event or performance data layer 12, as defined hereinabove. Performance data layer 12 comprises a plurality of logged events that are recorded in video file layer 16. The events logged in performance data layer 12 are synchronized to timecode layer 14, so that each particular event logged in performance data layer 12 is traceable or otherwise associated with respective frames in video file layer 16. The events logged into performance data layer 12 are typically associated with a particular player and/or team member. Examples of composite file 10 with an event data layer include the files generated by commercially available software Opta™, discussed in a more detail by Eigil Hakedal Skjæveland referenced herein. The content of the Eigil Hakedal Skjæveland Master's Thesis on Identifying Higher-Level Semantics in Football Event Data is hereby incorporated herein in its entirety by this reference.

The events logged in performance data layer 12 typically include positive as well as negative events. Examples of positive events include a field goal made (FGM) in basketball, whereas examples of negative events include a missed field goal, namely an attempted field goal (FGA) that did not end up with a field goal made (FGM). Others examples of positive events include a steal (STL) in basketball, whereas a respective example of a negative event may include a turnover (TO).

Figure 2:
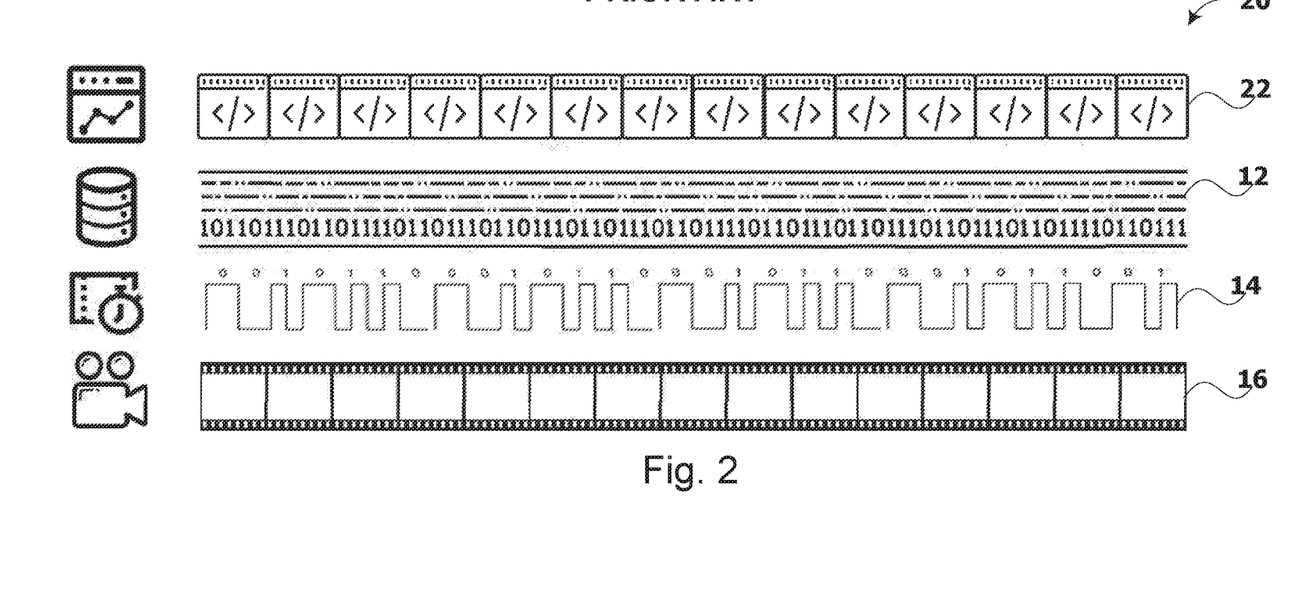
FIG. 2 is a schematic representation of the structure of a file including an even data layer and progressivistic metadata layer, synchronized with a timecode or keykode of a video file, according to some embodiments of the present invention.

In accordance with some embodiments of the present invention, reference is now made to FIG. 2, showing schematic representation of the structure of a composite file 20. Similarly to the prior art composite file 10, shown in FIG. 1, composite file 20 shown in FIG. 2 includes video file layer 16 of a sport event, timecode layer 14 and performance data layer 12, typically including positive, attempted and/or negative encoded events. Contradistinctively to prior art composite file 10 shown in FIG. 1, composite file 20 shown in FIG. 2, additionally to video file layer 16, timecode layer 14 and event data layer 12, includes progressivistic metadata layer 22.

Progressivistic metadata layer 22 includes a plurality of logged events that has not occurred during the sporting game recorded in video file layer 16. The events logged in progressivistic metadata layer 22 are synchronized to timecode layer 14, so that each particular event logged in progressivistic metadata layer 22 is traceable or otherwise associated with respective frames in video file layer 16. The events logged into progressivistic metadata layer 22 are typically associated with a particular player and/or team member.

It is further noted that contradistinctively to prior art composite file 10 shown in FIG. 1, a plurality of different events are optionally encoded into progressivistic metadata layer 22 of composite file 20 shown in FIG. 2, for a particular instance in timecode layer 14, so that several logged events in progressivistic metadata layer 22 correspond or otherwise are associated with the same frame or set of frames in video file layer 16.

The events logged into progressivistic metadata layer 22 are typically associated with a particular player and/or team member. An event encoded into progressivistic metadata layer 22 of composite file 20 is preferably correlated to an event encoded into performance data layer 12, where both events are typically synchronized to the same instance in timecode layer 14, so that both events, the event logged in performance data layer 12 as well as the event event logged in progressivistic metadata layer 22, are traceable or otherwise associated with the same frame or set of frames in video file layer 16. An event encoded into progressivistic metadata layer 22 of composite file 20 is optionally non-correlated to any event encoded into performance data layer 12.

Examples of events logged into progressivistic metadata layer 22, of composite file 20 shown in FIG. 2, optimally include the same types of events, which are recorded in performance data layer 12, such as field goals (FG), free throws (FT), three-point field goals (3FGM), rebounds (REB), offensive rebounds (OREB), defensive rebounds (DREB), assists (AST), steals (STL), blocks (BLK) turnovers (TO) and personal fouls (PF), in basketball. Events logged into progressivistic metadata layer 22 of composite file 20 typically do not include the distinction between positive and negative events, contradistinctively to performance data layer 12 of prior art composite file 10 shown in FIG. 1.

Events logged in progressivistic metadata layer 22 of composite file 20 typically do not include the distinction between made events, attempted events and percentage, contradistinctively to the events in performance data layer 12 of prior art composite file 10 shown in FIG. 1. Events logged into progressivistic metadata layer 22 of composite file 20 optionally include an associative metric, such as a proposed reasoning for occurrence of a particular event logged into progressivistic metadata layer 22 or any other miscellaneous alphanumerical data associated with a particular event logged into progressivistic metadata layer 22.

Figure 3:
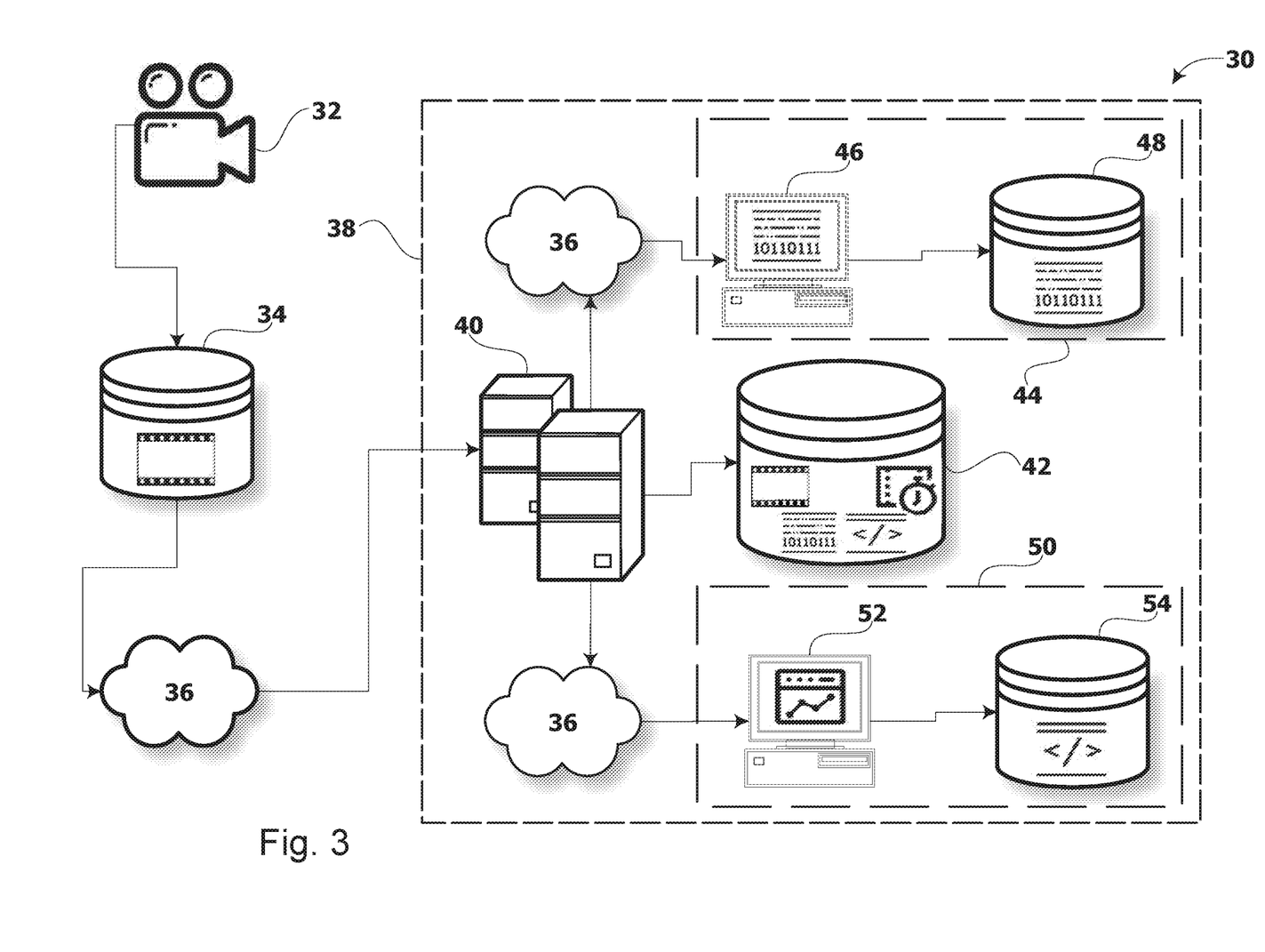
FIG. 3 is schematic block-diagram of a system for collecting and processing progressivistic metadata, according to some embodiments of the present invention.

In accordance with some embodiments of the present invention, reference is now made to FIG. 3, showing a system 30 for collecting and processing progressivistic metadata. System 30 includes video file source 32. Video file source 32 optionally includes a recording of a stream of a sport event. Video file source 32 optionally comprises an interface configured for transferring a video file to video file database 34. It is noted that the interface of video file source 32 is optionally an online interface, providing an access to system 30 and/or video file database 34. The video file is transferable from the interface of video file source 32 to system 30 and/or video file database 34 in a non-limiting manner by uploading the video file to system 30 and/or video file database 34.

Video file source 32 is typically connected to video file database 34. The video files in video file database 34 optionally further includes a timecode layer, as defined hereinabove, directly into and/or forming a part of and/or otherwise combined with a video file layer, configured to uniquely identify particular frames or at least distinct segments in the video file layer.

The video files in video file database 34 are optionally transferable via computer network 36 to sub-system 38 for collecting and processing progressivistic metadata. Sub-system 38 includes server 40 for processing progressivistic metadata and database 42 for storing composite files including a progressivistic metadata layer. Since the events encoded into the progressivistic metadata layer are related to particular instances in the timecode layer as well as optionally correlated to various events encoded into the performance data layer, database 42 for storing composite files is typically a relational database, as defined hereinabove. Server 40 typically includes a relational database management system (RBDMS) of database 42.

Sub-system 38 for collecting and processing progressivistic metadata optionally includes performance data module 44, configured for collecting and recording performance data. Performance data module 44 typically includes computational device 46, configured for generating and recording the performance data layer. In some embodiments, computational device 46 optionally includes a monitor, configured to display the video file, obtained via computer network 36 from video file database 34 and an interface, configured for manually logging events into performance data layer, by a human operator. In some embodiments, computational device 46 implements an artificial intelligence algorithm, configured for automated logging of events into performance data layer.

Performance data module 44 optionally includes performance data database 48, configured for temporarily storing and/or cashing composite files, such as composite file 10 shown in FIG. 1, with performance data layer having events encoded thereto, generated by computational device 46. In some embodiments, however, sub-system 38 for collecting and processing receives prepared composite files, such as composite file 10 shown in FIG. 1, with performance data layer having events encoded thereto, via computer network 36, such as event data generated by commercially available software Opta™, discussed in a more detail by Eigil Hakedal Skjæveland referenced herein. Therefore performance data module 44, computational device 46 and performance data database 48 are merely optional.

Sub-system 38 for collecting and processing progressivistic metadata includes progressivistic metadata module 50, configured for collecting and recording progressivistic metadata. Progressivistic metadata module 50 typically includes computational device 52, configured for generating and recording the progressivistic metadata layer. In some embodiments, computational device 52 optionally includes a monitor, configured to display the video file as well as optionally the performance data, obtained via computer network 36 from server 40 for processing progressivistic metadata and/or database 42 for storing composite files including a progressivistic metadata layer and/or performance data module 44 and/or computational device 46 and/or performance data database 48.

In some embodiments, computational device 52 includes an interface, configured for manually logging events into progressivistic metadata layer, by a human operator. In some embodiments, the interface of computational device 52, configured for manually logging events into progressivistic metadata layer, is further implemented for defining possible relations between the events encoded in the progressivistic metadata layer and events encoded in the performance data layer as well as for specifying the associative metric, as set forth hereinabove.

Progressivistic metadata module 50 optionally includes progressivistic metadata database 54, configured for temporarily storing and/or cashing composite files, such as composite file 20 shown in FIG. 2, with the progressivistic metadata layer having events encoded thereto, generated by computational device 52 or at least the progressivistic metadata component of such composite file.

It is noted that at least two of the following constituents: progressivistic metadata module 50, computational device 52, progressivistic metadata database 54, server 40 for processing progressivistic metadata and/or database 42 for storing composite files including a progressivistic metadata layer and/or performance data module 44 and/or computational device 46 and/or performance data database 48 are optionally integrated or implemented separately, on different computers interconnected by computer network 36.

Figure 4:
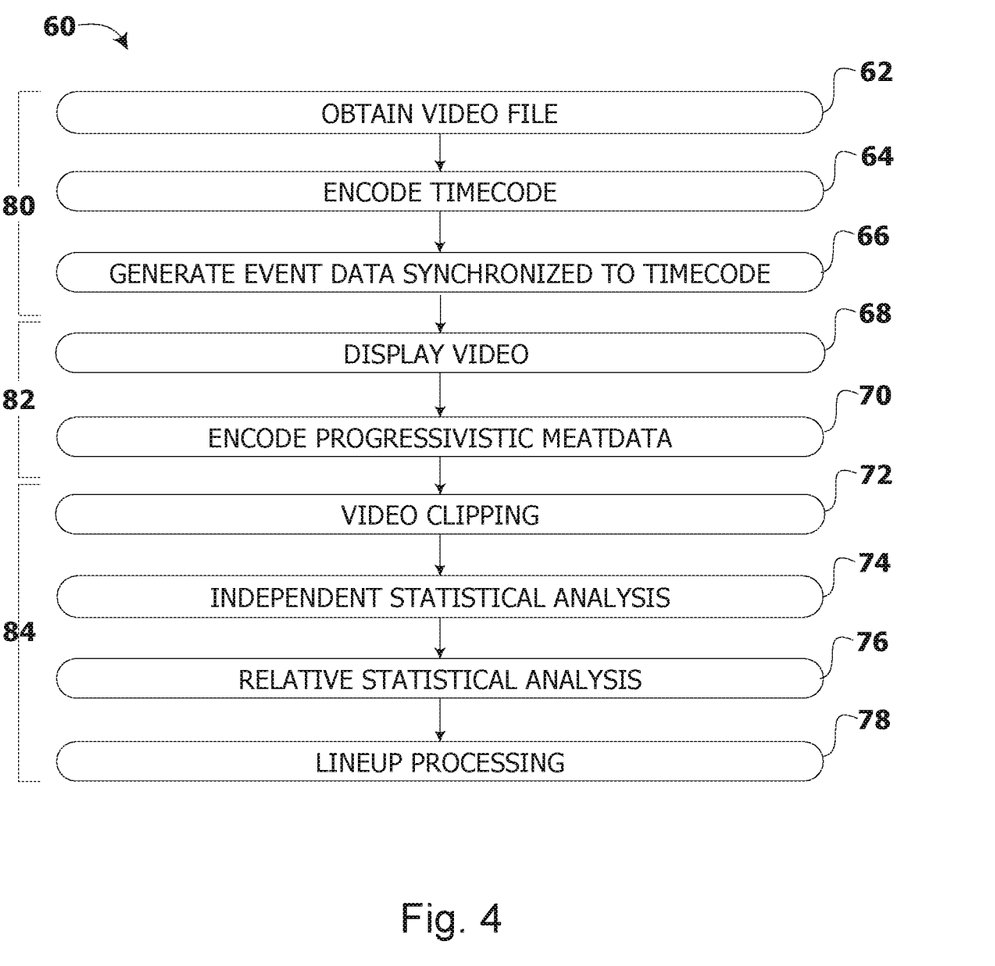
FIG. 4 is a flowchart of a method for collecting and processing progressivistic metadata, according to some embodiments of the present invention.

In accordance with some embodiments of the present invention, reference is now made to FIG. 4, showing a flowchart of method 60 for collecting and processing progressivistic metadata. Method 60 commences with optional pre-processing phase 80, which optionally includes obtaining a video file at step 62. Then a timecode layer, as defined hereinabove, is optionally encoded at step 64 into video files obtained at step 62.

The video file with timecode encoded hereto at step 64 is then processed, at step 66, so that event data layer is generated and synchronized with timecode. Pre-processing phase 80 of method 60 typically ends up at step 66. As prepared composite files, such as composite file 10 shown in FIG. 1, with performance data layer having events encoded thereto, is optionally procurable from commercially available software Opta™, discussed in a more detail by Eigil Hakedal Skjæveland referenced herein, pre-processing phase 80 of method 60 and/or steps 62, 64 and 66 are merely optional.

Method 60 further includes processing phase 82, which typically includes step 68 of displaying video file as well as optionally the performance data, obtained and/or generated during pre-processing phase 80. Processing phase 82 of method 60 further includes step 70 of manually logging events into progressivistic metadata layer, by a human operator. Examples of events logged into progressivistic metadata layer at step 70, in a non-limiting manner, include field goals (FG), free throws (FT), three-point field goals (3FGM), rebounds (REB), offensive rebounds (OREB), defensive rebounds (DREB), assists (AST), steals (STL), blocks (BLK) turnovers (TO) and personal fouls (PF), in basketball.

In some embodiments, step 70 of processing phase 82 further includes logging possible relations between the events encoded in the progressivistic metadata layer and events encoded in the performance data layer as well as for specifying the associative metric, as set forth hereinabove.

Method 60 preferably includes post-processing phase 84. Post-processing phase 84 of method 60 optionally includes step 72 of dipping. Clipping step 72 optionally includes editing and/or compiling segments/frames of the video layer, in accordance with a specific event logged in the progressivistic metadata layer. Clipping step 72 optionally includes cutting out and/or extracting and/or presenting segments/frames of the video layer, associated with a specific event logged in the progressivistic metadata layer.

Post-processing phase 84 of method 60 optionally further includes step 74 of independent statistical analysis. Independent statistical analysis of step 74 typically includes summing up and/or comparison of the values of various progressivistic metadata parameters within themselves and to, between or among themselves. Examples of independent statistical analysis performed of step 74 include counting the values of parameters such as field goals (FG), free throws (FT), three-point field goals (3FGM), rebounds (REB), offensive rebounds (OREB), defensive rebounds (DREB), assists (AST), steals (STL), blocks (BLK) turnovers (TO) and personal fouls (PF), in basketball, for a particular player/team member and/or a group of players/team members and/or the entire team, for a portion of a game and/or entire game, as well as the comparison of values of such parameters between different games, seasons, etc.

Post-processing phase 84 of method 60 optionally further includes step 76 of relative statistical analysis. Relative statistical analysis of step 76 typically includes comparison of values of various progressivistic metadata parameters to values of various performance data parameters. In some embodiments, relative statistical analysis of step 76 typically includes comparison of values of various progressivistic metadata parameters, within themselves and/or to, between or among themselves, for which at step 70 of processing phase 82 relations have been logged between the events encoded in the progressivistic metadata layer and events encoded in the performance data layer.

Examples of relative statistical analysis performed of step 76 include counting the values of parameters in the progressivistic metadata layer such as field goals (FG), free throws (FT), three-point field goals (3FGM), rebounds (REB), offensive rebounds (OREB), defensive rebounds (DREB), assists (AST), steals (STL), blocks (BLK) turnovers (TO) and personal fouls (PF), which are related to the values of parameters in the progressivistic metadata layer such as field goal made (FGM), field goal attempted (FGA), steals (STL) or turnovers (TO).

Post-processing phase 84 of method 60 optionally further includes step 78 of lineup processing. Lineup processing of step 78 typically includes comparison of values of various progressivistic metadata parameters within themselves and/or to, between or among themselves and/or to values of various performance data parameters, for determining the most favorable combination of a group of players/team members and/or the entire team, for a particular task. Examples of lineup processing of step 78 includes picking up an optimal lineup of players/team members, inter alia based on financial and/or commercial considerations.

Figure 5:
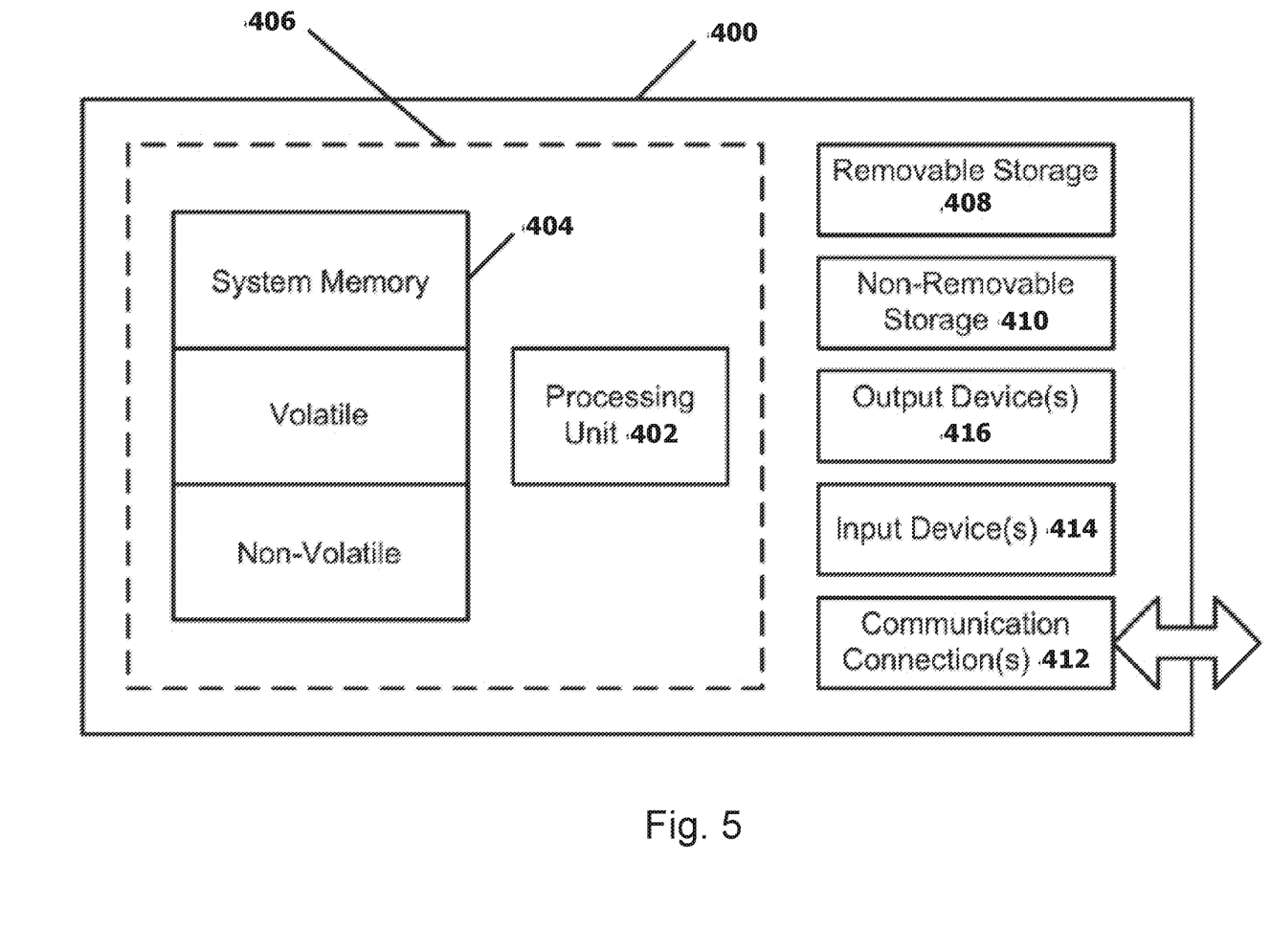
FIG. 5 is a schematic diagram of an exemplary computing environment.

With reference to FIG. 5, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random-access memory RAM), non-volatile (such as read-only memory ROM, flash memory, etc.), or some combination of the two. This most basic configuration is illustrated in FIG. 5 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 5 by removable storage 408 and non-removable storage 410.

Computing device 400 typically includes a variety of computer readable media. Computer readable media can be any available media that can be accessed by computing device 400 and include both volatile and non-volatile media, and removable and non-removable media. Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may contain communications connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

It will be appreciated by persons skilled in the art that the present invention is not limited by what has been particularly shown and described herein above. Rather the scope of the invention is defined by the claims which follow:

The invention claimed is:

1. A system for collecting and processing progressivistic metadata in sports comprises:
   a) a video file source, wherein said video file comprising a video file layer including a recording of a sport event;
   b) a video file database, configured for storing said video file therein, wherein said video file further comprising a timecode layer, configured for uniquely identifying particular frames or distinct segments in said video file layer;

said system is characterized by:
   c) a sub-system for collecting and processing progressivistic metadata comprising:

(I) a server configured for generating a progressivistic metadata layer, wherein events encoded into said progressivistic metadata layer are respectively related to particular instances in said timecode layer;

(II) a database configurable for storing composite files, wherein said composite files further comprising said progressivistic metadata layer.

2. The system of collecting and processing progressivistic metadata in sports, as in claim 1, further comprises a performance data module, configured for collecting and recording performance data, wherein events logged into said performance data are related to at least one member selected from the group consisting of: particular instances in said timecode layer and events encoded into said progressivistic metadata layer.

3. The system of collecting and processing progressivistic metadata in sports, as in claim 1, wherein said sub-system for collecting and processing progressivistic metadata further includes a progressivistic metadata module, configured for collecting and recording progressivistic metadata, selected from the group consisting of:
  a) an interface, configured for manually logging events into said progressivistic metadata layer, by a human operator;
  b) an interface configured for logging relations between said events encoded into said progressivistic metadata layer and events encoded into a performance data layer;
  c) an interface configured for specifying an associative metric.

4. The system of collecting and processing progressivistic metadata in sports, as in claim 1, wherein at least two members selected from the group consisting of: a progressivistic metadata module, a progressivistic metadata database, said server for processing progressivistic metadata, said database configurable for storing said composite files including said progressivistic metadata layer, a performance data module and a performance data database are integrated or implemented separately on different computers interconnected by a computer network.

5. A method of collecting and processing progressivistic metadata in sports comprises the steps of:
  a) providing a video file comprising a video file layer including a recording of a sport event;
  b) encoding and/or reading a timecode layer, configured for uniquely identifying particular frames or distinct segments in said video file layer;
  c) generating a progressivistic metadata layer, wherein events encoded into said progressivistic metadata layer are respectively related to particular instances in said timecode layer;
  d) forming composite files, wherein said composite files further comprising said progressivistic metadata layer.

6. The method of collecting and processing progressivistic metadata in sports, as in claim 5, further comprises collecting and recording performance data, wherein events logged into said performance data are related to at least one member selected from the group consisting of: particular instances in said timecode layer and events encoded into said progressivistic metadata layer.

7. The method of collecting and processing progressivistic metadata in sports, as in claim 5, further comprises collecting and recording progressivistic metadata, comprising at least one step selected from the group consisting of:
  a) manually logging events into said progressivistic metadata layer, by a human operator;
  b) defining possible relations between events encoded in said progressivistic metadata layer and events encoded in a performance data layer;
  c) specifying an associative metric.

8. The method of collecting and processing progressivistic metadata in sports, as in claim 5, wherein said events logged into said progressivistic metadata layer collecting and recording progressivistic metadata comprise at least one member selected from the group consisting of: field goals (FG), free throws (FT), three-point field goals (3FGM), rebounds (REB), offensive rebounds (OREB), defensive rebounds (DREB), assists (AST), steals (STL), blocks (BLK) turnovers (TO) and personal fouls (PF).

9. The method of collecting and processing progressivistic metadata in sports, as in claim 5, further comprises at least one step selected from the group consisting of:
  a) editing and/or compiling segments and/or frames of said video layer, in accordance with a specific event logged into said progressivistic metadata layer;
  b) cutting out and/or extracting and/or presenting segments and/or frames of said video layer, associated with a specific event logged into said progressivistic metadata layer.

10. The method of collecting and processing progressivistic metadata in sports, as in claim 5, further comprises at least one step selected from the group consisting of:
  a) performing an independent statistical analysis of said progressivistic metadata;
  b) performing a relative statistical analysis including a comparison of various values of said progressivistic metadata parameters to various values of performance data parameters;
  c) summing up and/or comparison of the values of various progressivistic metadata parameters
  d) counting values of at least one parameter selected from the group consisting of: field goals (FG), free throws (FT), three-point field goals (3FGM), rebounds (REB), offensive rebounds (OREB), defensive rebounds (DREB), assists (AST), steals (STL), blocks (BLK) turnovers (TO) and personal fouls (PF), which are related to the values of parameters in the progressivistic metadata layer, including at least one parameter selected from the group consisting of: field goal made (FGM), field goal attempted (FGA), steals (STL) or turnovers (TO);
  e) counting values for a particular player/team member and/or a group of players/team members and/or the entire team;
  f) counting values for a portion of a game and/or entire game and/or between different games and/or seasons.

11. The method of collecting and processing progressivistic metadata in sports, as in claim 5, further comprises a lineup processing, comprising comparison of various values of said progressivistic metadata parameters, thereby determining a favorable combination of a group of players/team members and/or the entire team, for a predefined task.

12. A composite file comprising said progressivistic metadata layer, formed by performing said steps of said method of claim 5.

13. A non-transitory computer-readable storage medium, having computer-executable instructions stored thereon which, when executed by a computer micro-processor, causing said micro-processor collecting and processing progressivistic metadata in sports, said computer-executable instructions comprise:

a) instructions causing said micro-processor obtaining a video file comprising a video file layer including a recording of a sport event;
b) instructions causing said micro-processor encoding and/or reading a timecode layer, configured for uniquely identifying particular frames or distinct segments in said video file layer;
c) instructions causing said micro-processor generating a progressivistic metadata layer, wherein events encoded into said progressivistic metadata layer are respectively related to particular instances in said timecode layer;
d) instructions causing said micro-processor forming composite files, wherein said composite files further comprising said progressivistic metadata layer.

14. The non-transitory computer-readable storage medium, as in claim 13, further comprises instructions causing said micro-processor collecting and recording performance data, wherein events logged into said performance data are related to at least one member selected from the group consisting of: particular instances in said timecode layer and events encoded into said progressivistic metadata layer.

15. The non-transitory computer-readable storage medium, as in claim 13, further comprises instructions causing said micro-processor collecting and recording progressivistic metadata, comprising at least one set of instructions selected from the group consisting of:
a) instructions causing said micro-processor logging events into said progressivistic metadata layer;
b) instructions causing said micro-processor defining possible relations between events encoded in said progressivistic metadata layer and events encoded in a performance data layer;
c) instructions causing said micro-processor specifying an associative metric.

16. The non-transitory computer-readable storage medium, as in claim 13, further comprises instructions causing said micro-processor logging said events into said progressivistic metadata layer, comprising at least one member selected from the group consisting of: field goals (FG), free throws (FT), three-point field goals (3FGM), rebounds (REB), offensive rebounds (OREB), defensive rebounds (DREB), assists (AST), steals (STL), blocks (BLK) turnovers (TO) and personal fouls (PF).

17. The non-transitory computer-readable storage medium, as in claim 13, further comprises at least one set of instructions selected from the group consisting of:
a) instructions causing said micro-processor editing and/or compiling segments and/or frames of said video layer, in accordance with a specific event logged into said progressivistic metadata layer;
b) instructions causing said micro-processor cutting out and/or extracting and/or presenting segments and/or frames of said video layer, associated with a specific event logged into said progressivistic metadata layer.

18. The non-transitory computer-readable storage medium, as in claim 13, further comprises at least one set of instructions selected from the group consisting of:
a) instructions causing said micro-processor performing an independent statistical analysis of said progressivistic metadata;
b) instructions causing said micro-processor performing a relative statistical analysis including a comparison of various values of said progressivistic metadata parameters to various values of performance data parameters;
c) instructions causing said micro-processor summing up and/or comparison of the values of various progressivistic metadata parameters;
d) instructions causing said micro-processor counting values of at least one parameter selected from the group consisting of: field goals (FG), free throws (FT), three-point field goals (3FGM), rebounds (REB), offensive rebounds (OREB), defensive rebounds (DREB), assists (AST), steals (STL), blocks (BLK) turnovers (TO) and personal fouls (PF), which are related to the values of parameters in the progressivistic metadata layer, incuding at least one parameter selected from the group consisting of: field goal made (FGM), field goal attempted (FGA), steals (STL) or turnovers (TO);
e) instructions causing said micro-processor counting values for a particular player/team member and/or a group of players/team members and/or the entire team;
f) instructions causing said micro-processor counting values for a portion of a game and/or entire game and/or between different games and/or seasons.

19. The non-transitory computer-readable storage medium, as in claim 13, further comprises a set of instructions causing said micro-processor performing a lineup processing, comprising comparing various values of said progressivistic metadata parameters, thereby determining a favorable combination of a group of players/team members and/or the entire team, for a predefined task.

* * * * *